3,005,467
Patented Oct. 24, 1961

3,005,467
MULTI-PORT VALVE
Bernard P. Suchoza and James K. Perhacs, Munhall, Pa., assignors, by mesne assignments, to the United States of America as represented by the United States Atomic Energy Commission
Filed Jan. 24, 1958, Ser. No. 710,944
7 Claims. (Cl. 137—625.11)

The present invention relates to a sampling device or valve having a plurality of inlet and outlet ports and means for selectively connecting each one of the outlet ports to a given one of the inlet ports.

Insofar as is known a valve of the type described herein has not heretofore been disclosed. The aforementioned multi-port valve is adapted for sampling one or more of a large number of input streams coupled to the inlet side of the valve. The selecting mechanism associated with the valve can be driven by suitable servo-mechanisms for sequentially sampling one or more of the inlet streams to the valve or alternatively, can be operated manually to make a sequential or random selection of these streams.

The multi-port valve of the invention is adapted for use in extracting samples of similar fluids from various types of processing equipment. For example, the multi-port valve can be used in conjunction with various types of autoclaves wherein a plurality of objects to be tested for various properties, such as corrosion in specified fluids, are supported in individual chambers within the autoclave and suitable conduits presently to be described are coupled between the individual chambers and respective ones of inlet ports of the valve disclosed herein. In this way, the status or progress of the objects being tested in the autoclave or autoclaves can be shown readily, and analyzing the fluid streams thus extracted from the autoclave, or the like, for the presence of various corrosion and erosional products is facilitated. In one aspect of the invention, the multi-port valve is adapted for use with a high temperature, high pressure vessel, such as an autoclave, or in applications wherein the aforementioned fluid is extremely hazardous insofar as operating personnel are concerned and zero leakage consequently must be maintained in the vessel, the multi-port valve, and associated connecting conduits, operating mechanisms, and other equipment.

In other applications of the invention, the multi-port valve disclosed herein is adapted for quickly indicating leaks of hazardous material at various portions of a chemical processing plant or other industrial plant wherein the material escaping from the system will show up immediately as contaminants in the environment surrounding the area of the leak. In this application of the invention, samples of the air or other medium surrounding the leaks are drawn through appropriate conduits by means presently to be described and conducted to the disclosed multi-port valve whereat suitable selecting means associated with the valve permit more or less continuous monitoring of the samples for an indication of the aforementioned leaks and their locations.

In other applications of the invention the multi-port valve can be utilized for quickly ascertaining the appearance of contaminants in one of a plurality of fluid streams, for example, in a number of ventilation air conduits associated with an industrial plant, factory building, office building or the like. The individual streams conducted to the multi-port valve from the incoming or outgoing ventilation air ducts of the aforementioned structures can be checked readily and quickly for the appearance of contaminants which are hazardous to personnel within the structure or, in the case of industrial plants, which would create a health hazard if vented to the surrounding atmosphere.

In still other applications of the invention the multi-port valve can be utilized for quickly comparing samples from the same relative points of a plurality of paralleled chemical process or the like in which the fluids flowing through the parallel processes are to be maintained as identical as possible. Such requirements are established in certain industrial processes, for example the production of pharmaceuticals.

Previous arrangements employed in the aforementioned applications have included complicated conduit systems, numerous valves, pumps, and the like. Obviously such prior systems in addition to being complex and difficult to maintain are rather expensive in their initial installation.

In view of the foregoing discussion, it is an object of the present invention to provide a novel and efficient multi-port selector valve.

Another object of the invention is to provide a multi-port valve adapted for use in hazardous fluid systems or in conjunction with sealed systems maintained at elevated pressures or temperatures.

A further object of the invention is to provide a multi-port selector valve having novel means associated therewith for coupling selected ones of the inlet ports of the valve to one or more outlet ports thereof.

Another object of the invention is to provide a multi-port selector valve with means associated therewith for remotely and sequentially operating the selecting mechanism of the valve.

Yet another object of the invention is to provide a multi-port valve wherein the operating mechanism associated therewith can be hermetically sealed within a given fluid system.

The aforementioned and additional objects, features and advantages of the invention will be elaborated upon during the forthcoming description of illustrative embodiments of the invention with the description being taken in connection with the accompanying drawings in which:

Referring now more particularly to FIGS. 1 to 6 of the drawings, the illustrative form of the invention shown therein is adapted particularly for use in conjunction with hermetically sealed fluid systems which additionally are maintained at elevated pressures or temperatures or both. In one arrangement of the invention the multi-port valve includes a pressurized valve housing 10 and a valve actuator housing indicated generally by the reference character 12. The latter-mentioned housing 12 includes a generally cylindrical rotor enclosure 14 and a cylindrical shaft extension enclosure 16. The valve mechanism presently to be described is operated by an intermittently actuated electric motor denoted generally by the reference character 18 and including a rotor 20 hermetically sealed within the rotor enclosure 14. In an arrangement wherein the rotor 20 is sealed within the housing 12, the rotor is of a windingless type, for example, a salient pole or squirrel cage rotor, in order to obviate the provision of leads through the sealed and pressurized housing 12 or 10. The rotor 20, however, is conventional in construction and is arranged to impart rotary motion to an elongated driving shaft 22 extending through the center of the rotor 20 and protruding from each end thereof. However, as described more fully hereinafter the driving shaft 22 is mounted for linear as well as rotary movement.

The rotor 20 is mounted for rotation within the rotor cavity 24 of the rotor enclosure 14 upon suitable antifrictional devices, for example, ball bearings 26 and 28. In this arrangement of the invention the inner and outer races of the upper bearing 26 are positioned between an outwardly extending shoulder 30 of the rotor 20 and an inwardly extending shoulder 32 of the rotor enclosure 14. On the other hand, the inner race of the lower bearing 28 is clamped between a flange portion 34 formed integrally with the lower end portion of the rotor 20 and an annular nut 36 threadedly secured to the flange portion 34. The outer race of the lower bearing 28 is clamped between a short tubular projection 38 formed in this example integrally with the lower end of the housing section 14 and an annular shoulder 40 formed adjacent the upper end of a thermal barrier structure 162 inserted within the valve housing 10 and described hereinafter in greater detail.

A motor stator 44 is mounted on the external surface of the housing section 14 at a position adjacent to the rotor 20 sealed within the housing section 14. Accordingly, the stator 44 is not sealed within the system and is removable from the motor 18 without disturbing the hermetically sealed enclosure surrounding the rotor 20 and associated mechanisms. In one arrangement the stator 44 can be mounted for ready removal relative to the rotor 20 in the manner described in the copending application of William E. McCowan, entitled "Electric Motor Devices," Serial No. 496,832, filed February 20, 1955, now Patent No. 2,857,537, and assigned to the present assignee. With this arrangement the stator structure 44 need not be hermetically sealed. In order to permit the development of adequate torque in the rotor 20 and at the same time employ a pressurized housing section 14 having a wall portion 46 of adequate thickness to withstand the pressure applied to the interior of the valve in certain applications thereof, the housing section 14 or at least the wall portion 46 thereof can be fabricated from a material of intermediate permeability such as that described in the aforementioned copending application. Electrical losses in the stator structure 44 can be removed in the form of heat by a suitable stator cooling system (not shown) associated with the outer periphery of the stator structure 44, such as that shown in the previously mentioned copending application, if a housing surrounding the stator structure 44 is employed. In the arrangement shown in FIGS. 1A and 1B, however, the laminated base 48 is extended through the wall of stator housing 50 in order to conduct these stator losses to the surrounding atmosphere.

Figure 1A:
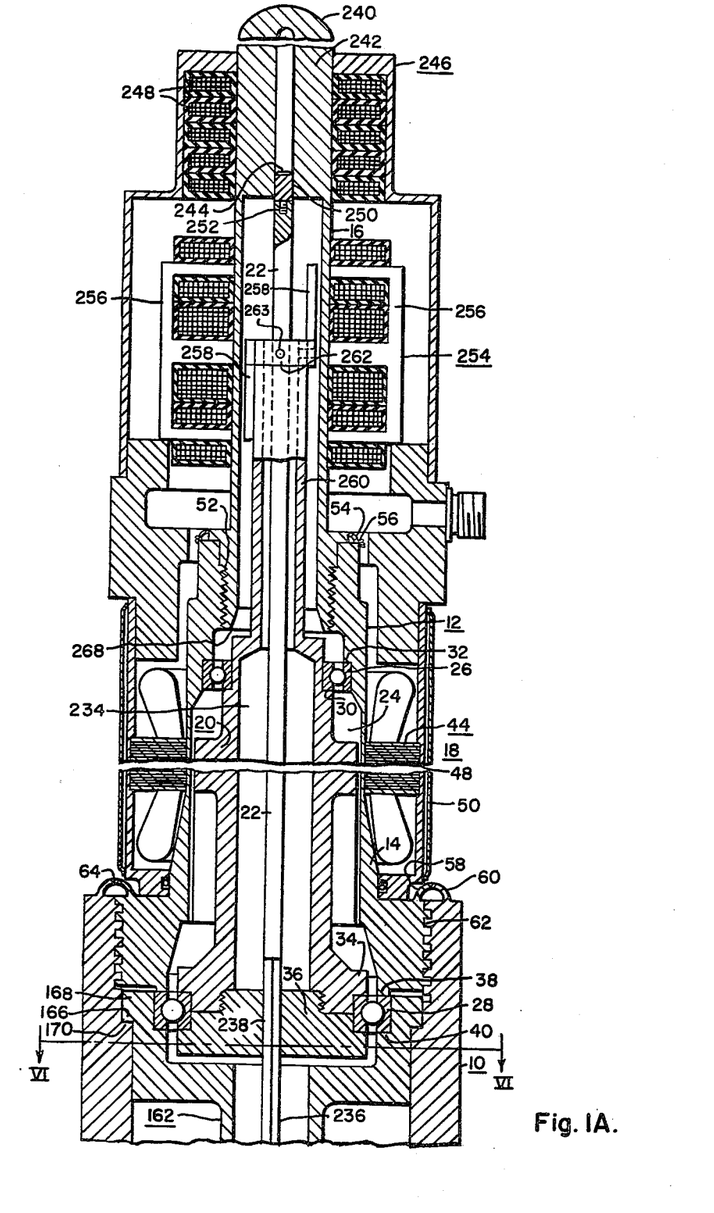
FIGURES 1A and 1B are a bi-partite longitudinally sectioned view of one form of multi-port valve and operating mechanism therefor arranged in accordance with the invention.

In the event that the multi-port valve arrangement of FIG. 1A is employed with a hermetically sealed system, suitable seal-welding means are utilized for hermetically sealing the various joints between the housings 10 and 12 and the adjoining structural components associated with the hermetically sealed system, which components are described hereinafter in greater detail. Various forms of such seal-welding means are described in Patent 2,805,789 to E. J. Kreh, Jr., et. al., entitled "Container End Structure," issued September 10, 1957, to the present assignee.

In an exemplary application, the upper motor housing section 16 is threadedly secured to the lower motor housing section 12 by means of threads 52 and in addition is sealed thereto by means of a quarter-circular shell 54. The shell 54 can be formed integrally with one of the housing sections, for example, the upper housing section 16, and when these parts have been secured as aforesaid, the upper section 16 is hermetically sealed to the lower section 12 by means of an annular sealing weld 56 joining the shell 54 to the upper end of the housing 12. In a similar manner the rotor housing 14, which is threadedly secured to the valve housing 10, is hermetically sealed thereto by seal-welding a pair of continuous projections 58 and 60 extending in this example integrally from areas of the rotor housing 14 and the valve housing 10, respectively, adjacent the junction 62 therebetween. These projections 58 and 60 are hermetically sealed by provision of an annular sealing weld 64 joining the projections 58 and 60.

The lower end of the valve housing 10 is joined to a suitable port member 66 which, for example, is formed integrally with a hermetically sealed vessel or container (not shown), or other portion of a sealed system with which the invention can be employed. When assembling the valve housing 10 to the port 66, a circular projection 68 is formed in this example integrally with a tube sheet 70, presently to be described. The projection 68 is provided with a suitable keying arrangement, for example, the milled surface indicated by the reference character 71 for insertion into a complimentary keying surface (not shown) formed on the inner surface of constricted section 74 of the port member 66. Use of the aforesaid keyed arrangement prevents turning of the tube sheet 70 and the valve housing 10 which otherwise would tend to damage the connections presently to be described between the multi-port valve and the various components of the sealed systems. When the keyed portions are thus engaged, the lower end of the valve housing 10 and associated components rest upon a shoulder 76 of the port member 66, which shoulder joins the constricted port section 74 with expanded section 78 of the port member 66. When the valve housing 10 is thus inserted an annular space 80 remains between the lower portion of housing 10 and the adjacent wall 82 of the port member 66.

Near the lower end of the housing 10 an annular groove 84 is formed into which is inserted a snap ring 86. The snap ring 86 is of such thickness to withstand the anticipated shear stresses which will be imparted thereto through the lower surfaces 88 of the tube sheet 70 by any pressures developed in the sealed system with which the multi-port valve is employed. The valve housing 10 is secured within the expanded port cavity 78 by means of an annular nut 90 inserted into the annular space 80 and threadedly secured to the port member 66 as denoted by the reference character 92. The annular nut 90 has an inwardly extending shoulder 94 engaging, when properly positioned, the top surface of the snap ring 86 and thus securing the lower end of the valve housing 10 within the port member 66. The junction between the annular nut 90 and the valve housing 10 and the port member 66, respectively, are hermetically sealed by means of quarter-circular, annular shell members 96 and 98, respectively. The shell members 96 and 98 are hermetically sealed by the use of hermetically sealing welds 100 and 102, respectively. With this arrangement the valve housing 10 is hermetically sealed to the port member 66 and hence to the remainder of the hermetically sealed system with which the multi-port valve is employed.

Figure 1B:
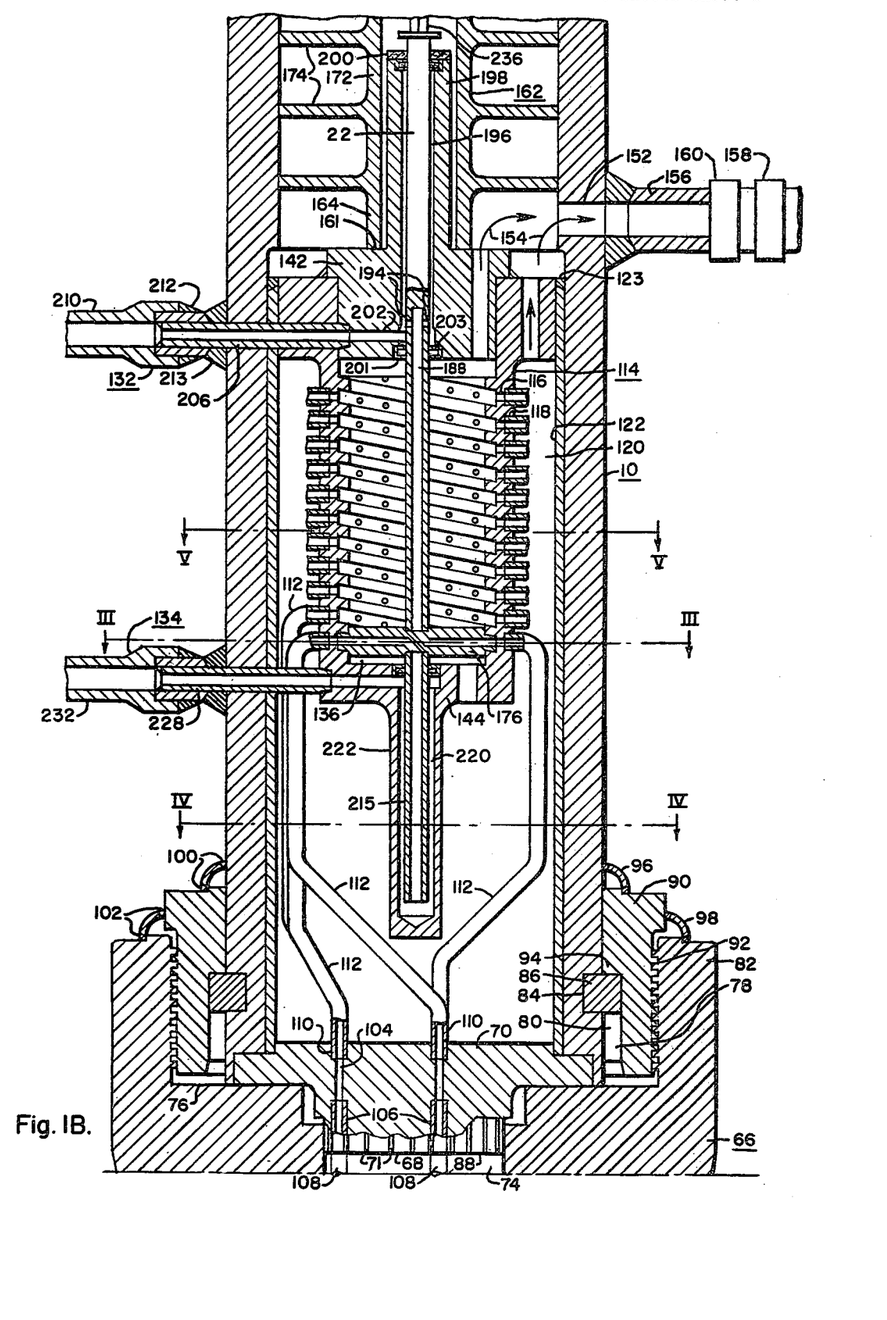
Figure 4:
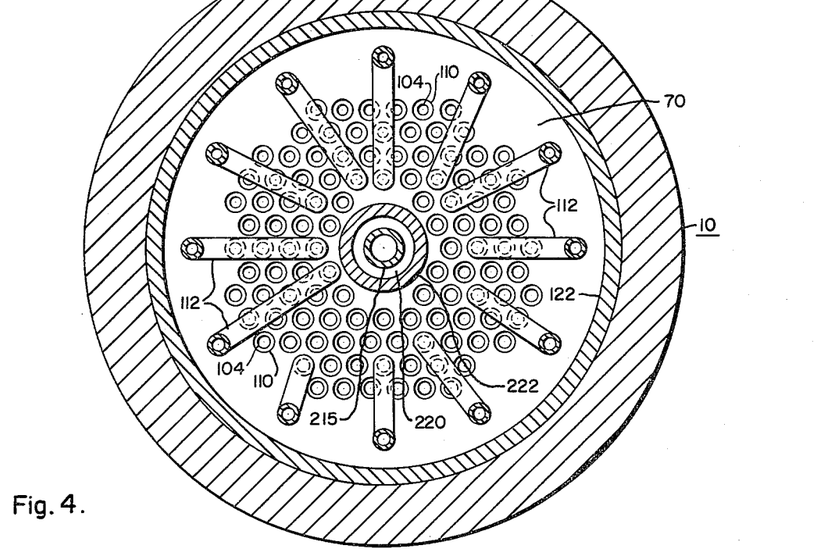
FIG. 4 is an enlarged cross-sectional view of the multi-port valve shown in FIG. 1B and taken along reference lines IV—IV thereof.

As better shown in FIG. 4 of the drawings, the tube sheet 70 has a plurality of flow apertures 104 formed therein and extending generally parallel with the longitudinal axis of the multi-port valve. At the lower ends 106 of the apertures, the flow apertures 104 are enlarged to receive respectively the ends of a like plurality of inlet conduits 108, as indicated in FIG. 1B of the drawings. In the latter figure only two of the inlet conduits 108 are shown for purposes of illustration although the number in this arrangement is equal to the number of flow apertures 104 in the tube sheet 70 (FIG. 4). It will be obvious as this description proceeds that a greater or lesser number of inlet conduits 108 and flow apertures 104 can be employed depending upon the size of the multi-port valve and the number of stations to be coupled thereto. The inlet conduits 108 are extended into the sealed or pressurized system to which the port member 66 is secured and are coupled respectively to various fluid compartments within the system, a portion of the fluid contents of which are to be withdrawn through the conduits 108 for sampling purposes or the like.

In a similar manner the flow apertures 104 are enlarged adjacent their upper ends as indicated by reference characters 110 for the receipt of a like plurality of connecting conduits 112 disposed within the valve housing 10. The connecting conduits 112 extend from the individual flow apertures 104 of the tube sheet 70 to a multi-port valve selecting mechanism including a casing member, which in this example is a generally cylindrical shell 114. The cylindrical member 114 is hollow and a wall portion thereof is provided with a plurality of inlet ports 116, the outer openings 118 of which are enlarged for insertion of the upper ends of the connecting conduits 112. With this arrangement each port 116 of the cylindrical member 114 is connected to a selected one of the fluid compartments or the like maintained within the aforesaid pressurized system. These connections are made through the connecting conduits 112 and the associated inlet conduits 108 and flow apertures 104 of the tube sheet 70.

In the particular arrangement of the invention illustrated in FIGS. 1 to 6 inclusive of the drawings, one hundred thirteen ports 116 are spaced around the periphery of the cylindrical member 110 in a manner presently to be described. Sufficient annular space 120 is provided between the outer periphery of the cylindrical member 114 and the inner periphery of a supporting cartridge or shell member 122 to permit placement of the one hundred thirteen connecting conduits 112 required in the example to couple the inlet ports 116 to respective ones of the flow apertures 104 and the inlet conduits 108. In this arrangement of the invention the supporting cartridge 122 extends from the lower end of the valve housing 10 to the top of the cylindrical member 114. The cylindrical member 114 is secured to the cartridge 122, for example by a means of a mounting flange 148 and an annular structural weld 123, and is supported by the cartridge 122 within the valve housing 10. With this arrangement, the multi-port cylinder 114 and associated operated components of the valve mechanism can be easily inserted into the housing 10, when the multi-port valve is being assembled, and can be properly aligned with the presently described outlet ports 132 and 134 of the valve.

Figure 2:
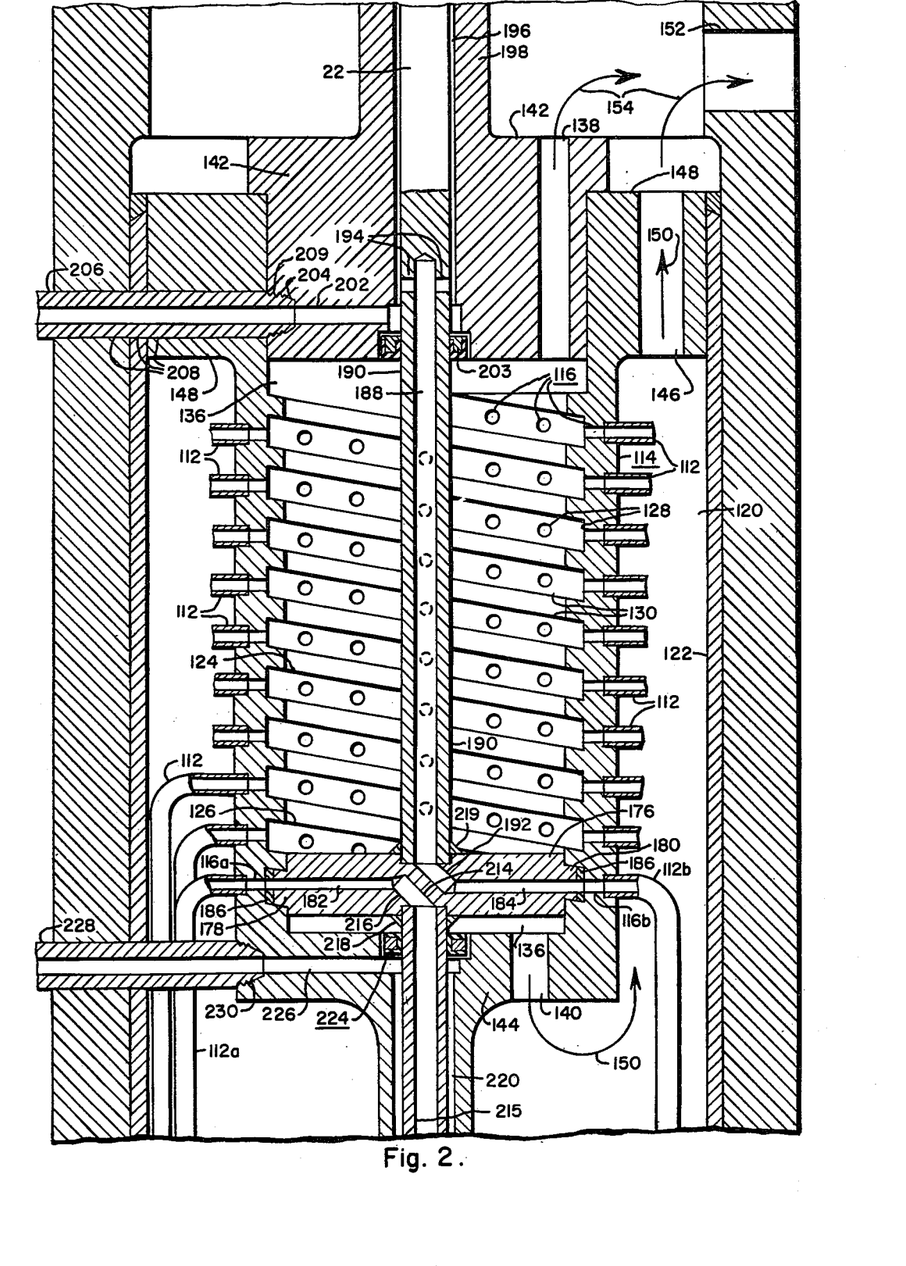
FIG. 2 is an enlarged, longitudinally sectioned partial view of the valve and valve selecting mechanism shown in FIG. 1B of the drawings.

In an exemplary arrangement, the inlet ports 116 are spaced equidistantly about the surface of the cylindrical member 114, as better shown in FIG. 2 of the drawings. In spacing the ports 116, these ports are arranged into two spiral or helical arrangements which are intertwined along the longitudinal length of the cylindrical member 114. On the inner periphery of the cylindrical member 114 a pair of helical grooves 124 and 126 are formed and are intertwined along the longitudinal axis of the cylindrical member 114. The helical grooves 124 and 126 form a two-start thread for the valve mechanism described hereinafter. The grooves or threads 124 and 126 and the spiral arrangement of the ports 116 in the form of the invention shown in FIGS. 1–6 are so arranged that inner openings 128 of the inlet ports are disposed at bottom walls 130 of the helical grooves 124 and 126. In this arrangement the groove 124 opens into fifty-seven of the one hundred thirteen ports 116 while the remaining fifty-six ports open into the groove 126. As better shown in FIG. 3 of the drawings, each complete convolution or loop of the helical groove 124 or 126 has twelve of the ports 116 opening into it.

A suitable valve mechanism is threadedly engaged in the helical grooves 124 and 126 and means are connected thereto for moving the valve mechanism for coupling selected ones of the ports 116 to respective ones of the valve outlet ports denoted generally by the reference characters 132 and 134. The remainder of the ports when not thus coupled to the valve mechanism discharge fluid, conducted thereto through associated ones of the inlet and connecting conduits 108 and 112 respectively, into a central cavity 136 of the cylindrical member 114. The fluid thus accumulated within the cavity 136 flows upwardly or downwardly through outlet apertures 138 and 140 formed respectively in the top plug member 142 and bottom wall 144 of the cylindrical member. That portion of the fluid conducted through the lower outlet aperture 140 flows upwardly through the annular space 120 between the cylindrical member 114 and the inner peripheral surface of the shell 122 where-upon it is conveyed through another flow aperture 146 extending through the mounting flange 148 of the cylindrical member 114 as indicated by through arrows 150. The effluent material issuing from either aperture 138 or 146 is then conducted out of the valve housing 10 through an exhaust port 152 formed in a wall portion of the housing 10, as indicated by flow arrows 154. From the port 152 the unused samples thus issuing from the ports 116, when not coupled to the selecting mechanism presently to be described, is conducted back to the system with which the multi-port valve is employed by means of a conduit 156.

The return conduit 156 desirably is connected to a relatively lower pressure area of the system in order to furnish motive power to cause the various fluid streams to flow into the multi-port valve through the associated inlet conduits 108 and to return the unused samples to the aforesaid system. However, in the event that a low pressure connection is not available in the system, or in the case of employment of the multi-port valve in systems which are not pressurized, a pump 158 desirably is coupled into the return conduit 156 to supply the necessary motive power. In the event that the valve 10 is to be used only intermittently or in case it is undesirable to extract continuous streams from these areas of the system being tested or monitored by the multi-port valve, a conventional stop valve 160 likewise is coupled in the conduits 156. The use of the valve 160 when closed will prevent the flow of fluid from the unused ports 16 of the valve when the pressure inside of the valve housing 10 is equalized with the pressure maintained within the various parts of the system coupled to the valve via the inlet conduits 108. However, those ports 116 which are coupled at any given time by the multi-port selecting mechanism, presently to be described, to the outlet ports 132 or 134 will still conduct fluid through the outlet ports although the valve 160 is closed. Closure of the valve 160 however would not be practical in those cases wherein the inlet conduits 108 are coupled to areas of differing pressures within the sealed system. When the system is not pressurized, a suitable pump or suction device (not shown) can be coupled to each outlet port 132 or 134 to withdraw fluid from the inlet port 116 coupled thereto. Alternatively, the outlet ports can be coupled through suitable collecting vessels or the like and connecting conduits (not shown) to a point in the return conduit 156 upstream of the pump 158.

In certain applications wherein the multi-port valve is employed with a high temperature sealed system it is contemplated that the rotor 20 will be immersed in the fluid of the system. Such fluid, of course, in many cases will serve as a lubricant for the bearings 26 and 28 of the rotor 20. However, means are provided by the invention to minimize the transfer of heat from the high temperature fluid supplied to the interior of the valve housing 10, in the manner described heretofore, to the rotor cavity 24. One arrangement for so minimizing the transfer of heat includes the provision of a thermal barrier denoted generally by the reference character 162 (FIGS. 1A and 1B) and inserted within the upper portion of the valve housing 10. The lower end 161 of the thermal barrier rests upon the upper surface of the top plug 142 inserted in the cylindrical member 114. In this manner, the thermal barrier 162 is supported and positioned within the housing 10 inasmuch as the cylindrical member 114 in turn is supported as aforesaid by means of the shell or cartrdige 122. Additional support for the thermal barrier 162 is afforded, if desired, by means of an annular projection 166 at the top of the thermal barrier 162 which cooperatively engages an annular shoulder 170 formed on the inner periphery of the valve of housing 10.

In an exemplary application of the invention, the thermal barrier 162 is a labyrinth type seal arrangement including a tubular supporting member 172 extending centrally and longitudinally of the thermal barrier 162 and of the valve housing 10 and a plurality of spaced outwardly extended annular discs 174 which are joined to the supporting member 172. The outer edges of the annular discs 174 are shaped to engage the inner periphery of the valve housing 10 relatively closely and thus afford only limited flow paths for seepage of fluid from the valve housing 10 into the rotor housing 12. With this arrangement equalization of pressures at all areas within the multi-port valve and more particularly between the housings 10 and 12 thereof is accomplished. At the same time the restricted flow of fluid from the housing 10 to the rotor housing 12 minimizes the transfer of the heat from the valve housing to the rotor housing 12 and associated components. Use of the discs 174 also prevents the conduction of heat to the rotor housing 12 by means of convection currents through the annular space between the supporting member 172 and the inner periphery of the housing 10. Additionally the discs 174 provide heat-conductive paths between the supporting member 172 and the housing 10 and thus serve to minimize the transfer of heat by conduction through the supporting member 172 from the cylindrical member 114 to the rotor 20 and associated components, for example, the lower bearing arrangement 28.

Figure 3:
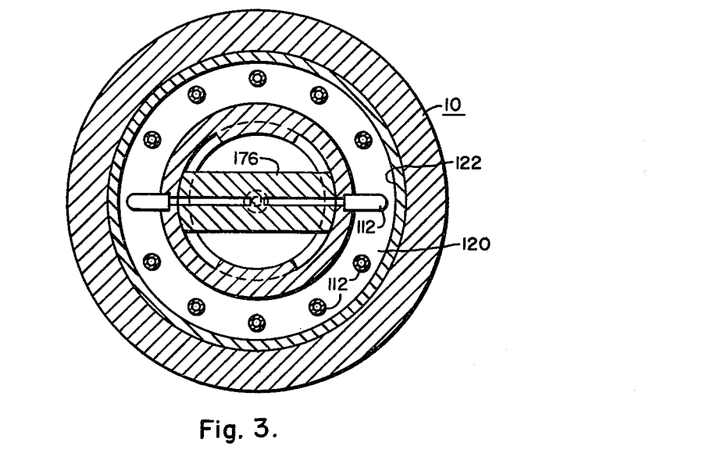
FIG. 3 is a cross-sectional view showing a portion of the selecting mechanism of FIG. 1B and taken along reference lines III—III thereof.

Referring now to FIGS. 2, 3 and 4 of the drawings, one form of the aforementioned valve or port selecting mechanism is illustrated in greater detail therein. In this arrangement of the invention the mechanism includes an elongated conduit member 176 mounted transversely within the hollow cylindrical member 114. At each end of the conduit member 176 is secured a partial thread 178 or 180 which is arranged to fit closely within the helical groove 124 or 126, respectively. Thus when operating torque is applied to the conduit member 176 the latter is caused to traverse the cavity 136 of the cylindrical member 114 in either the upward or downward direction thereof depending upon the direction of applied torque. Inasmuch as the partial threads 178 and 180 are threadedly engaged in the two-start thread respectively represented by the helical grooves 124 and 126, the conduit member 176 will be moved axially of the cylindrical member 114.

In one arrangement of the invention a flow passage 182 or 184 is formed adjacent each end of the conduit member 176, with each flow passage extending generally toward the axis of rotation of the conduit member. The flow passages 182 and 184 of the conduit member 176 are alignable with diametrically opposed ones of the ports 116 formed in the cylindrical member 114, such that a pair of these ports can be coupled to the flow passages 182 or 184 at a given time. In furtherance of this purpose the flow passages 182 and 184 extend through the partial threads 178 and 180, respectively, of the conduit member so that these openings are adjacent and closely fitted relative to the bottom wall portion 130 of each of the grooves 124 and 126. Thus to the outward edge of each partial thread 178 or 180 is secured, in some applications, a layer of suitable packing or plastic bearing material 186, such as the fibrous plastic material known by the trademark Micarta, and manufactured by Westinghouse Electric Corporation. The bearing material 186 surrounds the outer opening of each flow passage 182 or 184 and, being arranged to closely fit the bottom walls 130 of the grooves 124 and 126, serves as a sealing means to minimize loss of fluid when the flow passages 182 and 184 are aligned with selected ones of the plurality of ports 116, for example, the ports 116a and 116b, respectively (FIG. 2). However, when used under severe conditions such as with highly corrosive fluids or at elevated temperatures, the aforementioned plastic bearing material 186 is replaced by a harder bearing material such as a nickel-cobalt-chromium-tungsten alloy sold under the trademark "Stellite," or a similarly hard material. This alloy is much harder than the stainless steel employed for fabricating the cylindrical member 114 in such applications, and bearing contact between these materials of differing hardness, produces a relatively effective seal and minimum leakage between the flow passages 182 and 184 and the respective inlet ports 116.

That sample or fluid stream which is extracted from the port 116b and the connecting conduit 112b through the flow passage 184 is conducted into a central cavity 188 of a hollow lower end portion 190 of the drive shaft 22. As better shown in FIG. 2 of the drawings, the flow passage 184 in one arrangement is coupled to the cavity 188 through an inclined flow passage 192. From the cavity 188 of the drive shaft the fluid flows upwardly and through a pair of outlet apertures 194 disposed in the hollow portion of drive shaft 22 adjacent the upper end of the cavity 188 and into an annular flow passage 196. The passage 196 is formed between the drive shaft 22 and the upstanding tubular extension 198 secured to the top plug 142 of the cylindrical member 114 and loosely surrounding the adjacent portion of the drive shaft. Escape of fluid from the annular space 196 upwardly from the tubular extension 198 is prevented by a conventional packing gland denoted generally by the reference character 200. Instead, the aforementioned fluid exits from the annular space 196 adjacent the lower end thereof and flows through passage 202 formed in the plug member 142. Communication between the annular passage 196 and the inner cavity 136 of the cylindrical member 114 is likewise prevented by use of a conventional packing gland 203. The outer end of the aperture 202 terminates in a frusto-conical cavity 204 and a threaded portion 209 into which the inner end of a threaded conduit 206 is threaded and seated. The conduit 206 extends outwardly through aligned apertures 208 formed in the walls of the valve housing 10, the cartridge 122, and the mounting flange 148 of the cylindrical member 114. The conduit 206, in those applications in which the multi-port valve is hermetically sealed, is coupled to an outlet conduit 210 (FIG. 1B) which in turn is joined to the wall of the housing 10 by means of annular sealing welds 212 and 213, respectively. The outlet conduit 210 can be coupled to suitable devices (not shown) utilized for testing or comparing the fluid portions thus extracted by the multi-port valve.

In a similar manner the fluid entering the cylindrical member 114 via connecting conduit 112a and the associated inlet port 116a enters the flow passage 182 of the conduit member 176. From the flow passage 182 the fluid is conducted, through an inclined connecting passage 214 of the conduit member 176, into a downwardly extending tubular conduit 215 secured to the underside of the conduit member 176. The conduit 215 is joined to the member 176 and the latter in turn is secured to the lower end of the hollow drive shaft portion 190, by means of ring welds 218 and 219, respectively. As better shown in FIG. 1B of the drawings, the fluid sample collected at the left end of the conduit member 176, as viewed in FIG. 1B or 2 of the drawings, exits from the lower end of the tubular conduit 215 and then flows upwardly through an annular passage 220 between the conduit 215 and a tubular extension 222 secured to the undersurface of the bottom wall 144 of the cylindrical member 114 and loosely surrounding the conduit 215. Communication between the annular space 220 and the cavity 136 of the cylindrical member 114 is prevented by means of a conventional packing gland 224 mounted in the bottom wall 144 and surrounding the tubular member 214. For purposes hereinafter elaborated upon, the packing gland 224 and the previously mentioned glands 200 and 203 permit longitudinal and rotary movements of the conduit 215 and the above shaft 22 inserted respectively therethrough.

From the annular passage 220 the fluid supplied to the tubular conduit 215 is conveyed through a flow channel 226 formed in the bottom wall 144 of the cylindrical member 114. Communicating with the channel 226 is a threaded conduit 228. The conduit 228 is similar to the conduit 206 described above and is threadedly engaged with a tapped outer opening 230 of the channel 226. As shown in FIG. 1B, the outer end of the threaded conduit 228 is joined to an outlet conduit 232 in a manner similar to that described in connection with the outlet conduit 210.

The upper tubular extension 198 and the bottom wall tubular extension 222 are provided in order that the outlet ports 132 and 134 will remain in communication with the drive shaft cavity 188 and the tubular member 215, respectively, and thence to the conduit member 176, as the later is moved, by means presently to be described, throughout its normal traverse within the cavity 136 of the cylindrical member 114. These tubular extensions 198 and 222 thus lend variable longitudinal dimensions to the annular flow passages 196 and 220, respectively, in order to permit linear as well as rotational movement of the conduit member 176 and associated components.

As indicated previously, rotational movement is imparted to the driving shaft 22 by means of the rotor 20, and the driving shaft extends through a central cavity 234 of the rotor. In this arrangement of the invention torque is applied to the driving shaft 22 by the rotor 20 by means of a keyed arrangement which additionally permits longitudinal or linear movement of the drive shaft 22. One form of such arrangement includes a keying square configuration 236 imparted to a portion of the drive shaft 22 and equivalent in length to not less than the extent of travel of the conduit member 176. The keyed configuration 236 of the drive shaft is arranged to cooperate with a keyed similarly shaped central aperture extending through the bearing retaining nut 36 of the rotor 20, as better shown in FIG. 6 of the drawings. With this arrangement, as the conduit member 176 is rotated by the driving shaft 22 thereby causing it to traverse the helical grooves 124 and 126, the necessary linear movement of the driving shaft 22 is permitted by sliding between the keying configuration 236 of the driving shaft 22 and the keyed aperture 238 of the bearing retaining nut 36.

In order to determine which ones of the ports 116 are coupled to the conduit member 176, means are provided for indicating the vertical or linear position of the driving shaft 22 and for showing the rotary or angular position of the rotor 20 and conduit member 176. The signals received from the linear and rotary positioning indicating means can be employed by suitable servo-mechanism to cause the motor 18 of the multi-port valve to actuate and stop the port selecting conduit member 176 in order to couple the member to pairs of the inlet ports 116 in a sequential manner. In this fashion the fluid streams conducted to the multi-port valve through the inlet conduits 108 and ports 116 can be withdrawn or sampled in a sequential fashion. It will be appreciated as this description proceeds that the electric motor driving means 18 associated with the multi-port valve can be eliminated and that conventional valve mechanism, for an example, can be inserted through the top 240 of upper driving shaft guide sleeve 242 and rigidly secured to the upper end 244 of the driving shaft 22 in order to impart rotary motion thereto.

One form of the aforementioned linear position indicating means, denoted generally by the reference character 246, comprises a plurality of position indicating coils 248 disposed in a tandem array along the length of the driving shaft guide sleeve 242. The total length of the array of positioning coils 248 is equivalent to the distance traversed by the drive shaft 22 and the conduit member 176 during operation thereof. Each of the position indicating coils 248 is arranged to yield a suitable signal through appropriate well-known indicating circuitry (not shown), when a magnetic slug 250 is disposed adjacent a given one of each of the position indicating coils 248. The magnetic slug 250 in this arrangement threadedly is secured to the upper end of the driving shaft 22 as indicated by the reference character 252. Thus the position of the magnetic slug 250 relative to the longitudinal array of position indicating coils 248 denotes the vertical or linear position of the driving shaft 22. Desirably the adjacent structural components of the multiport valve including the driving shaft 22 and the guide sleeve 242 are fabricated from non-magnetic materials, for example, non-magnetic stainless steel.

Alternatively, the position indicating arrangement 246 can be replaced by the linear position indicating arrangement described and claimed in a copending application of P. S. Nissenson, entitled "Position Indicator," S.N. 264,246, filed February 26, 1957, now abandoned, and assigned to the present assignee. In the later positioning arrangement, it is contemplated on the other hand that the entire upper end portion of the driving shaft 22 be fabricated from a magnetic material, for example, magnetic stainless steel, silicon steel or other suitable alloy. The guide sleeve 242 in the latter arrangement however is desirably fabricated from a non-magnetic material as aforesaid. As described in the application of Nissenson, the position indicating coils are connected in series to an inductance bridge which shows the position of a linearly moving magnetic element.

One form of the aforementioned rotary position indicating means is denoted generally by the reference character 254 and is described and claimed in a copending application of P. S. Nissenson et al., entitled "Telemetring Systems," Serial No. 643,817, filed March 4, 1957, now Patent No. 2,862,163, and assigned to the assignee of the present application. As explained in detail in the last-mentioned copending application the rotary position indicator 254 includes a plurality of E-core transformers 256, with three being utilized in this arrangement, which form a synchrotransmitting device when employed with a pair of salient magnetic poles 258. The magnetic poles 258, desirably are secured to a tubular extension 260 of the rotor 20 and therefor only the rotary motion of the conduit member 176 is imparted to the magnetic poles 258 by the rotor 20. The salient poles 258, which are fabricated from one of the magnetic materials denoted heretofore, are displaced in longitudinal and rotary positions relative to one another. The salient poles 258 are secured to a ring member 262 which in turn is fastened adjacent the upper end of the rotor extension 260 by means of set screw 263. During operation of the multi-port valve, rotation of the salient poles 258 induces rotating signals in the E-core field of the synchrotransmitter, comprising the rotary position indicator 254, which signals induce synchromovement of the rotor associated with a synchroreceiving device (not shown) described in the aforementioned copending application of Nissenson et al. The resultant positions of the aforementioned synchroreceiving rotor indicate the corresponding positions of the rotor 20 and conduit member 176. Consequently the synchroreceiving rotor can be coupled to a suitable servo-mechanism (not shown) for starting and stopping the rotor 20 of the multi-port valve at selected positions of the conduit member 176 relative to the inlet ports 116.

Figure 7:
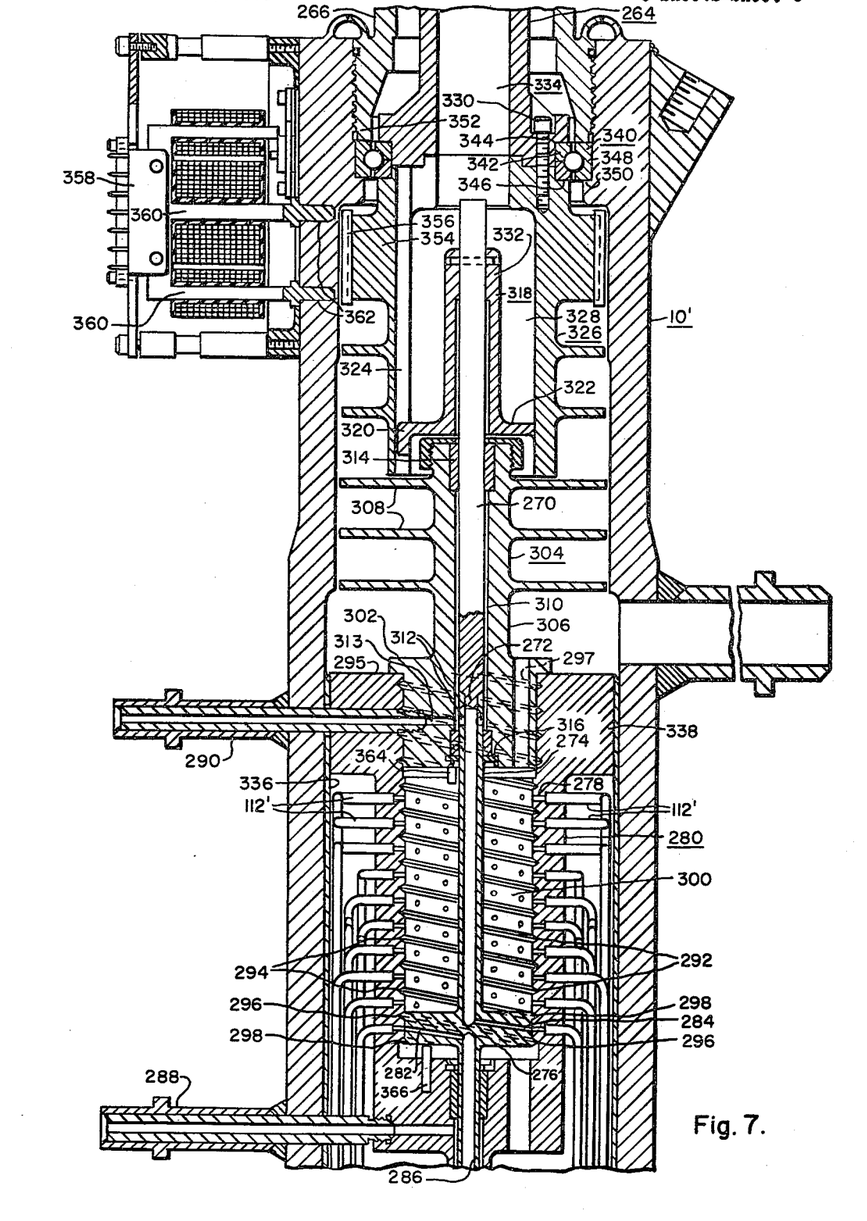
FIG. 7 is a partial, longitudinally sectioned view of another form of multi-port valve constructed in accordance with the invention.

Referring now to FIGURE 7 of the drawing, another illustrative form of the invention is shown therein. In this arrangement of the invention the multi-port valve is arranged for use with a different form of rotary position indicator presently to be described and with a modified form of port selecting member and of the fluid coupling thereof with the individual inlet ports of the multi-port valve. In other respects, the multi-port valve and associated components shown in FIG. 7 are similar to the illustration of FIGS. 1A and 1B with the exception that the linear position indicator 246, the rotary position indicator 254, the upper motor housing section 16 including the guide sleeve 242, and the upper rotor extension 260 are eliminated.

In the arrangement of the invention according to FIG. 7, then, the multi-port valve is driven by a rotor 264, the lower end portion of which appears in this FIGURE 7 and by a stator (not shown) similar to that illustrated in FIG. 1A. The rotor 264 is, in this example, hermetically sealed within a rotor enclosure 266. The rotor enclosure 266 is generally of the same configuration as the rotor enclosure 14 shown in FIG. 1A with the exception that the top or upward end 268 (FIG. 1A) of the rotor enclosure 14 is completely closed or made into a continuous wall portion, inasmuch as the upper rotor enclosure section 16 is not utilized in this form of the invention. The rotor 264 is arranged to impart driving torque to a driving shaft 270, which is secured through linear motion linkage, presently to be described, to the lower end of the rotor 264.

The lower end of the driving shaft 270 is attached by means of welding at its projecting stud portion 272 to a tubular conduit 274. The conduit 274 in turn is joined at its lower end to a port selecting conduit member 276. The conduit member 276 is arranged for communication at selected positions thereof with a given pair of inlet ports 278 of a hollow casing 280, which in this example is cylindrical in form. The cylindrical member 280 is similar in construction to the casing member 114 of FIGS. 1B and 2 and the inlet ports 278 thereof are coupled to conduits 112'. The connecting conduits in turn are coupled through the tube sheet 70 (FIGS. 1B and 2) and a like number of inlet conduits 108 in the manner described heretofore in connection with FIGS. 1 to 6.

In the arrangement shown in FIG. 7 the conduit member 276 is provided with a pair of inclined flow passages 282 and 284 which are coupled respectively through the conduit 274 and through another conduit 286 secured to the under surface of the conduit member 276 to a pair of outlet ports 288 and 290 in the manner described heretofore in connection with the flow passages 182 and 184 of FIG. 2. The conduits 274 and 286 likewise are arranged for rotary and linear movement with the conduit member 276. In this manner the flow passages 282 and 284 of the conduit member 276 are continuously coupled to the outlet ports 288 and 290 respectively of the multi-port valve irrespective of the linear position of the conduit member 276.

The inlet ports 278 of the cylindrical member 280 are arranged in a helical or spiral array about the upstanding wall portion of the cylindrical member 280 and in this example the number of these ports 278 is the same as that noted heretofore in connection with the inlet ports 116. In this arrangement, however, the helical array of inlet ports 272 are disposed between alternating convolutions of a pair of V-shaped grooves 292 and 294. The grooves 292 and 294 constitute a two-start thread formed on the inner peripheral surface of the hollow cylindrical member 280. The grooves 292 and 294 are continued to the top surface 295 of the cylindrical member 280, as indicated by dashed lines 297, to permit insertion and withdrawal of the conduit member 276 relative to the cylindrical member, when a plug member 302 thereof is removed.

Figure 5:
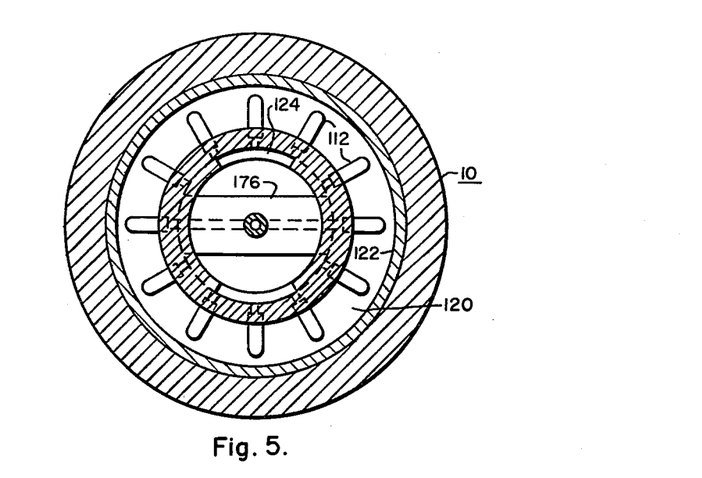
FIG. 5 is another cross-sectional view showing the multi-port valve of FIG. 1 and taken along reference lines V—V thereof.
Figure 6:
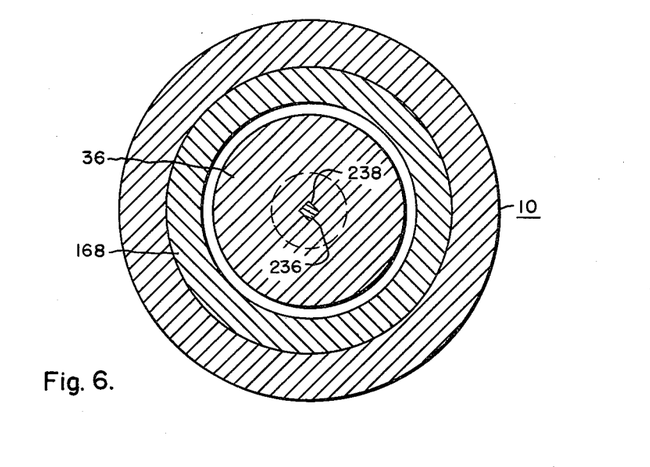
FIG. 6 is another cross-sectional view of the multi-port valve illustrated in FIGS. 1A and 1B and taken along reference lines VI—VI of FIG. 1A.

The conduit port selecting member 276 is elongated in the transverse direction and likewise is of a generally parallelpiped configuration such as is the one shown in FIGS. 2, 3 and 5 of the drawings. At the lateral ends of the conduit member 276 are formed a pair of partial threads 296 and 298. The partial threads 296 are engaged in the spiral groove 292 while the partial threads 296 are engaged in the adjacent groove 294. At each end of the conduit member 276 the partial threads 296 and 298 are disposed one on each side of the outward opening of the flow passage 282 or 284. With this arrangement, as the conduit member 276 traverses the inner cavity 300 of the cylindrical member 280, the flow passages 282 and 284 of the conduit member can be aligned or coupled sequentially with each diametric pair respectively of the inlet ports 278. In order to minimize leakage when the flow passages 282 and 284 of the conduit member 276 are so aligned, the end portions of the aligned conduit member and the partial threads 296 and 298 thereof are machined to a relatively close fit between these components and the associated threads 292 and 294 and the inner periphery of the cylindrical member 280. Improved sealing of the coupling between the outer openings of the flow passages 282 and 284 and the inner openings of the inlet ports 278 can be provided through use of one of the aforementioned plastic or hard bearing materials provided at each end of the conduit 276 and surrounding the outlet openings of its flow passages. Usage of the V-shaped grooves 292 and 294 permit easier machining of the inner periphery of the cylindrical member 280.

The upper opening of the cylindrical member 280 is closed by the aforementioned plug member 302, through which the conduit 274 communicates with the outlet port 299, secured to the plug member 302 in a manner similar to that described in connection with the plug member 142 and threaded conduit 206 of FIGS. 1B and 2. To the upper surface of the plug member 302 however is secured a thermal barrier 304 comprising a relatively short tubular supporting extension 306 and a plurality of annular discs 308 secured transversely of the supporting extension 306. The driving shaft 270 is mounted for rotary and linear movement relative to the thermal barrier 304 and extends through the central cavity thereof. The driving shaft 270 fits relatively loosely within the aforementioned central cavity, and thus an annular flow passage 310 is formed between the supporting extension 306 and the driving shaft 270. The annular passage 310 serves to couple the conduit 274 through flow apertures 312 adjacent the upper end thereof and through a flow passage 313 of the plug member 302 with the outlet port 290. The annular passage 310 is isolated from the interior of the valve housing 10 by means of packing glands 314 and 316 in which the driving shaft 270 and the tubular conduit 274 joined thereto are mounted for rotary and linear movement.

A keying member 318 is secured to the driving shaft 270 adjacent the upper end thereof. The keying member 318 is provided with a tab 320 joined to the outer periphery of a spacing flange 322 of the keying member. The tab 320 is cooperatively inserted in a longitudinal groove 324 formed at the inner periphery of an upper thermal barrier 326. The latter thermal barrier is similar to the lower thermal barrier 304 with the exception that it is provided with a larger central cavity 328 in order to permit insertion of the keying member 318. The upper thermal barrier 326 is rigidly secured to the lower end of the rotor 264 for rotation therewith by means of a plurality of cap screws 330. With this arrangement rotary motion is imparted to the driving shaft 270 and the conduit port selecting member 276 by means of the tab and groove arrangement 320 and 324. However, the tab and groove arrangement permits linear movement of the driving shaft 270, the keying member 318 and the port selecting member 276 as the latter traverses the threads 292 and 294 of the cylindrical member 280.

The keying member 318 is furnished with an elongated body portion 332, the diameter of which is limited to permit insertion of the body portion 332 and the upper end of the driving shaft 270 into the central cavity 334 of the rotor 264, as the port selecting member moves upwardly from its position shown in FIG. 7 of the drawings. The groove 324 which extends longitudinally of the upper thermal barrier 326 is of sufficient length to conform to the extent of travel of the port selecting member 276 and the components coupled thereto.

In this arrangement of the multi-port valve, the cylindrical member 280, the lower thermal barrier 304, and the valve components associated therewith are supported within the valve housing 10' by means of a cartridge or shell member 336. The shell member is secured as by welding, to mounting flange 338 of the cylindrical member 280 and is closely fitted and supported within the housing 10' in the manner shown in connection with the cartridge 122 of FIGS. 1B and 2. The upper thermal barrier 326, however, is supported together with the rotor 264 by means of a thrust bearing arrangement 340. The inner race 342 of the bearing 340 is clamped between offset portions 344 and 346 formed in the rotor 264 and the upper thermal barrier 326, respectively, adjacent the junction therebetween. The outer race 348 of the bearing 340 is supported upon an inwardly extending annular shoulder 350 of the housing 10' and is clamped in this position by the lower, threaded end 352 of the rotor housing 266.

In order to ascertain the position of the port selecting member 276 relative to the array of inlet ports 278, position indicating means are utilized to show the rotary and linear positions of the selecting member 276 and associated movable components of the valve mechanism. A suitable form of position indicating means presently to be described is arranged to cooperate with a plurality of magnetic slugs or inserts, which obviously can be disposed at the outer periphery of either the rotor 264 or the upper thermal barrier 326. In the form of the invention illustrated in FIG. 7, however, the position indicating means is associated with the upper thermal barrier 326 and to this end the latter component is provided with a magnetic slug supporting flange 354.

Flange 354 and adjacent components of the multi-port valve including the housing 10' desirably are formed from a non-magnetic material, such as non-magnetic stainless steel. The supporting flange extends outwardly toward the inner wall surface of the housing 10' and a plurality of magnetic slugs 356 are secured at spaced positions about the outer periphery of the flange 354 and near the wall of the housing 10'. The positions of the slugs 356 correspond to the vertical rows of inlet ports 278 which in this arrangement of the invention are grouped into twelve such vertical rows. The magnetic slugs 356 cooperate wtih an E-core transformer arrangement denoted generally by the reference character 358 for determining the rotative position of the port selecting member. In furtherance of this purpose, two legs 360 of the E-core transformer are extended effectively through the adjacent wall portion of the housing 10' by means of magnetic inserts 362.

In the operation of the rotary position indicator, comprising the E-core transformer 358 and the magnetic slugs 356, a pulse appears in the secondary circuit of the E-core transformer 358 as each one of the magnetic slugs 356 is aligned with the legs 360 of the E-core transformer. In this arrangement of the invention twelve such pulses occur during each revolution of the port selecting member 276, and slugs 356 are positioned about the periphery of the supporting flange 354 such that each pulse occurs when the selecting member is aligned precisely with a given pair of the inlet ports 278. As pointed out heretofore, these pulses also will occur as the ends of the port selecting member 276 are aligned with diametrically opposed vertical rows of inlet ports 278. Consequently, by coupling suitable pulse counting circuitry (not shown) in the output circuit of the E-core transformer 358, the linear position as well as the rotary position of the port selecting member 276 will be indicated, since twelve such pulses, in the exemplary arrangement, are equivalent to one revolution of the selecting member 276. The limits of travel of the conduit member 276 are defined respectively by suitable stop members, for example, pins 364 and 366, secured to the plug member 302 and the bottom wall portion respectively of the cylindrical member 280. Thus, when the conduit member 276 is coupled sequentially to respective pairs of the inlet conduits 278 by energization of the rotor 264, the particular pair coupled to the conduit member 276 at a given time can be ascertained by counting the output pulses of the E-core transformer 358 as the conduit member 276 is moved from one or the other of the pins 364 and 366. Moreover, these pulses can be employed to actuate suitable servo-mechanism for starting and stopping the rotor 264 and the port selecting member 276 at sequential pairs of the inlet ports 276. Specific details of the rotary position indicator illustrated in FIG. 7 and the circuit connections associated therewith are described and claimed in a copending application of C. T. Wint et al., entitled "Position Indicating and Controlling Means," S.N. 738,730, filed May 29, 1958, and assigned to the present assignee. Obviously when the aforementioned pulse counting arrangement is employed the use of the linear position indicator illustrated in FIG. 1A of the drawings can be eliminated.

From the foregoing it will be apparent that novel and efficient forms of a multi-port valve have been disclosed herein. In certain applications, the valve is adapted for use in coupling a relatively large number of valve inlet conduits to suitable valve outlet conduits for testing or other purposes. Although the port selecting conduit members 176 and 276 have been constructed for coupling pairs of the respective inlet ports to a pair of valve outlet ports, it will be obvious that a single sample or stream can be withdrawn from a selected one of the inlet ports 116 or 278 through use of suitable stop valves (not shown) disposed in the outlet conduits 132 and 134 or 288 and 290, respectively. Alternatively, a one-start helical groove (not shown) can be substituted for either pair of the two-start helical grooves 122 and 126 or 292 and 294 and one end portion of either port selecting member 176 or 276 can be eliminated together with associated flow passages and outlet port, for those applications wherein simultaneous withdrawal of a pair of samples is not desired.

It will be apparent then that the descriptive material and drawings employed herein are intended for purposes of exemplifying the invention and are not to be interpreted as limitative thereof. Accordingly, numerous additional embodiments of the invention will occur to those skilled in the art without departing from the spirit and scope of the present invention. Moreover, it is to be understood that certain features of the invention can be employed without a corresponding utilization of other features thereof.

We claim as our invention:

1. In a multi-port valve, the combination comprising a cylindrical housing, a hollow cylindrical casing member mounted within said housing and having a plurality of inlet ports formed in the side wall thereof, conduit means for coupling said ports to a like number of fluid sources disposed exteriorly of said housing, a port selecting member threadedly engaging the inner side wall of said casing and having at least one flow passage adapted to communicate at one end thereof with said inlet ports, means for rotating said port selecting member, said rotation producing simultaneous axial movement of the port selecting member by said threaded engagement to positions of communication of said flow passage with individual ones of said ports, a tubular extension coaxial with and secured to said casing member, an elongated tubular member secured at one end to said port selecting member with the interior of the tubular member communicating with said flow passage, said tubular member loosely telescoping within said tubular extension and having its interior communicating with the annular space formed between said tubular member said tubular extension, and an outlet port located on said housing and communicating with said annular space, and seal means in the end of the casing between the telescoping members sealing the interior of the casing from said annular space.

2. A multi-port valve comprising a hollow casing member, said member having a plurality of inlet ports formed in a wall portion thereof, conduit means for coupling said inlet ports to a like number of fluid sources respectively disposed externally of said casing member, at least one spiral groove formed upon the inner periphery of said casing member, said inlet ports opening into the bottom wall portion of said groove, a movable port selecting member having a flow passage extending therethrough, a groove engaging partial thread secured to said port selecting member, said flow passage extending through said thread and communicating with selected ones of said inlet ports at selected positions of said port selecting member, said thread and groove arrangement cooperating to locate said flow passage of said port selecting member in alignment with said inlet ports, respectively, an outlet conduit secured to said casing member and conduit means coupling said outlet conduit to the flow passage of said port selecting member.

3. A multi-port valve comprising a hollow casing member, said member having a plurality of inlet ports formed in a wall portion thereof, inlet conduit means for coupling said inlet ports to a like number of fluid sources respectively disposed externally of said casing member, at least one spiral groove formed upon the inner periphery of said casing member, said inlet ports opening into the bottom wall portion of said groove, a movable port selecting member having a flow passage extending therethrough, a groove engaging partial thread secured to said port selecting member, said flow passage extending through said thread and communicating with selected ones of said inlet ports at selected positions of said port selecting member, means for moving said port selecting member along said groove to said positions, an outlet conduit secured to said casing member and intermediate conduit means coupling said outlet conduit to the flow passage of said port selecting member, said intermediate conduit means comprising loosely fitting telescoping tubular members coupled to said outlet conduit and to said flow passage respectively.

4. In a multi-port valve, the combination comprising, a hollow casing member having a plurality of inlet ports formed in a spiral array in a wall portion thereof, conduit means for coupling said inlet ports to a plurality of external fluid sources, respectively, at least one spiral groove on the inner periphery of said casing member having convolutions of said spiral port arrangement, a port selecting member having at least one flow passage formed therein and having a pair of partial threads engaging said spiral groove, the flow passage of said port selecting member opening between said threads for engagement with a selected one of said inlet ports, means for moving said port selecting member along said grooves to positions of said engagement, an outlet conduit secured to said casing member, an additional conduit means for coupling the other end of said flow passage to said outlet conduit.

5. In a multi-port valve, the combination comprising a hollow casing cylinder having a plurality of inlet ports formed in a spiral array therein, a pair of spiral grooves formed on the inner periphery of said casing cylinder and disposed adjacent said spiral port array, an elongated port selecting member having a pair of flow passages formed therein and having partial threads secured to the ends respectively thereof, said partial threads engaging said grooves respectively, each of said flow passages opening at said ends respectively, said openings being positioned for alignment with selected pairs of diametrically opposed ports, means for moving said port selecting member along said grooves to said pairs, a pair of outlet conduits secured to said casing cylinder and individual conduit means for coupling the other ends of said flow passages to said outlet conduits respectively.

6. In a multi-port valve, the combination comprising a hollow casing cylinder having a plurality of inlet ports formed in a spiral array therein, a pair of spiral grooves formed on the inner periphery of said casing cylinder and disposed adjacent said spiral port array, an elongated port selecting member having a pair of flow passages formed therein and having partial threads secured to the ends respectively thereof, said partial threads engaging said grooves respectively, each of said flow passages opening at said ends respectively, said openings being positioned for alignment with selected pairs of diametrically opposed ports, means for moving said port selecting member along said grooves to said pairs, a pair of outlet conduits secured to said casing cylinder and individual conduit means for coupling the other ends of said flow passages to said outlet conduits respectively, said conduit means each comprising a pair of loosely fitting telescoping conduit sections communicating through an annular space between said sections and coupled respectively to one of said flow passages and associated ones of said outlet ports.

7. A multi-port valve for use in sampling one of a number of input streams coupled to the inlet side of the valve comprising a housing, a hollow cylindrical casing within the housing, a plurality of inlet ports extending radially through the side wall portion of said casing, inlet conduit means for coupling the outer ends of said inlet ports to a like number of stations respectively disposed exteriorly of said casing, an outlet conduit in the end portion of said casing and extending through the housing, intermediate conduit means for selectively coupling one of said ports to said outset conduit, cooperating screw thread means formed on the inner side wall of the casing and said intermediate conduit means for producing axial movement of said intermediate conduit means in response to rotational movement thereof wih respect to said casing, means for rotating said intermediate conduit means to engage the latter with a seleited one of said inlet ports, at least one flow aperture in a wall portion of the casing communicating between the interior of said casing and the interior of said housing, and an exhaust conduit extending through the housing communicating with said housing interior for conducting a fluid material from those ports not coupled to said intermediate conduit means out of said housing.

References Cited in the file of this patent

UNITED STATES PATENTS

| | | |
|---|---|---|
| 1,016,382 | Weeden | Feb. 6, 1912 |
| 1,364,712 | Chenot | Jan. 4, 1921 |
| 2,152,021 | Baumer | Mar. 28, 1939 |
| 2,319,336 | McCullough | May 18, 1943 |
| 2,708,519 | Novak | May 17, 1955 |
| 2,818,881 | Bonner et al. | Jan. 7, 1958 |
| 2,821,998 | Mayhew | Feb. 4, 1958 |

FOREIGN PATENTS

| | | |
|---|---|---|
| 240,030 | Switzerland | Mar. 1, 1946 |